United States Patent [19]

Woerz et al.

[11] 4,353,761
[45] Oct. 12, 1982

[54] METHOD FOR SPIN BONDING ENDS FOR COMPOSITE CONTAINERS

[75] Inventors: Stephen E. Woerz, Florissant; Travis K. Canup, Ferguson, both of Mo.

[73] Assignee: Boise Cascade Corporation, Boise, Id.

[21] Appl. No.: 288,344

[22] Filed: Jul. 30, 1981

[51] Int. Cl.³ .......................... B29C 27/08; B65B 7/28
[52] U.S. Cl. .................................... 156/69; 156/73.5; 156/294; 156/580; 264/68; 264/248
[58] Field of Search ............... 156/73.5, 69, 580, 294; 228/2, 112; 229/5.5; 264/68, 248

[56] References Cited

U.S. PATENT DOCUMENTS

| | | | |
|---|---|---|---|
| 2,638,261 | 5/1953 | Poole | 229/5.5 |
| 3,128,215 | 4/1964 | Hood et al. | 156/69 |
| 3,316,135 | 4/1967 | Brown et al. | 156/69 |
| 3,615,965 | 10/1971 | Smith et al. | 156/69 |
| 3,690,088 | 9/1972 | Anderson et al. | 156/73.5 |
| 3,759,770 | 9/1973 | Brown et al. | 156/73.5 |
| 4,226,652 | 10/1980 | Berg | 156/73.5 |

FOREIGN PATENT DOCUMENTS 1436217  5/1976  United Kingdom .............. 156/73.5

*Primary Examiner*—Michael G. Wityshyn
*Attorney, Agent, or Firm*—Laubscher, Philpitt & Laubscher

[57] ABSTRACT

A composite container is disclosed having a synthetic plastic end closure member spin-bonded to the thermoplastic synthetic plastic inner liner layer of a composite container body wall. The synthetic plastic end closure member includes annular downwardly depending inner fin and outer chime portions which are concentrically spaced to define therebetween an annular groove. One of the body and end members is rotated relative to the other member when they are in spaced vertical alignment, whereupon the members are axially displaced together to wedge the upper end of the body member into the annular groove of the end closure member. During this spin bonding process, the fin portion of the end closure member is supported against radial inward deflection, whereby the spinning frictional engagement between the fin portion of the end closure member and the inner liner layer of the body member causes softening and subsequent bonding of the fin portion to the inner liner layer.

3 Claims, 12 Drawing Figures

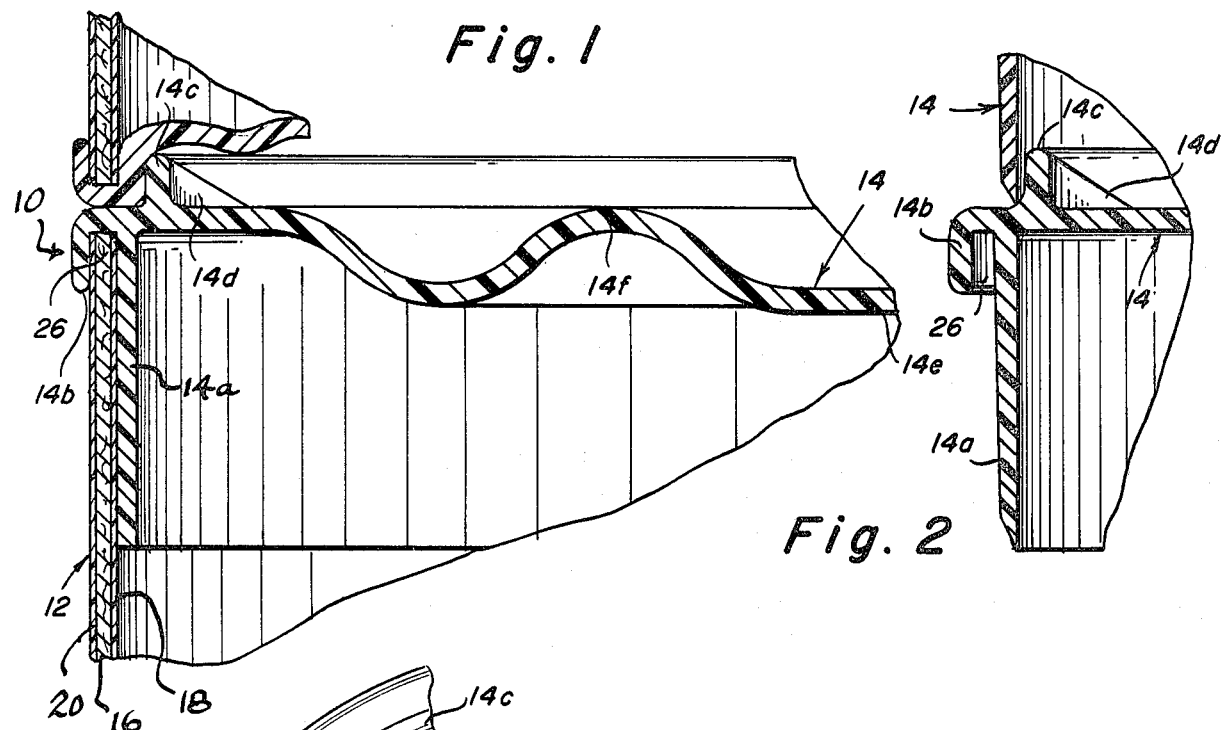
Fig. 1
Fig. 2
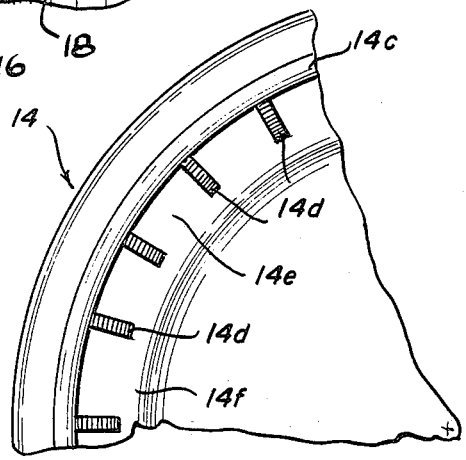
Fig. 3
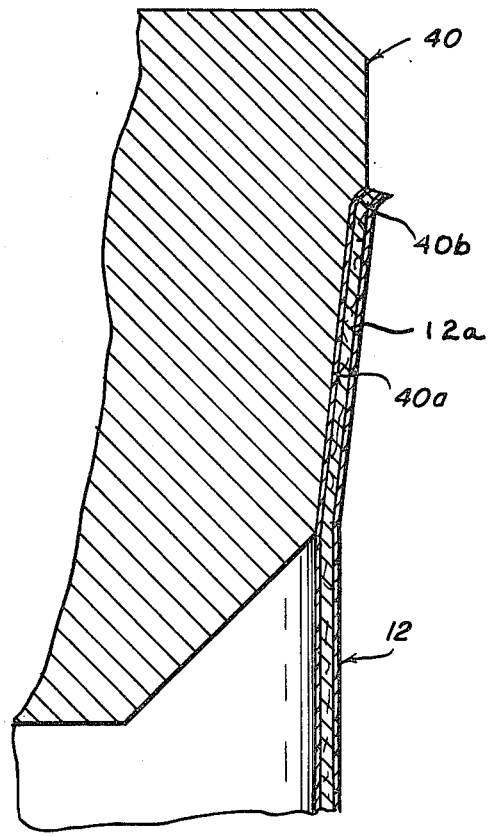
Fig. 4

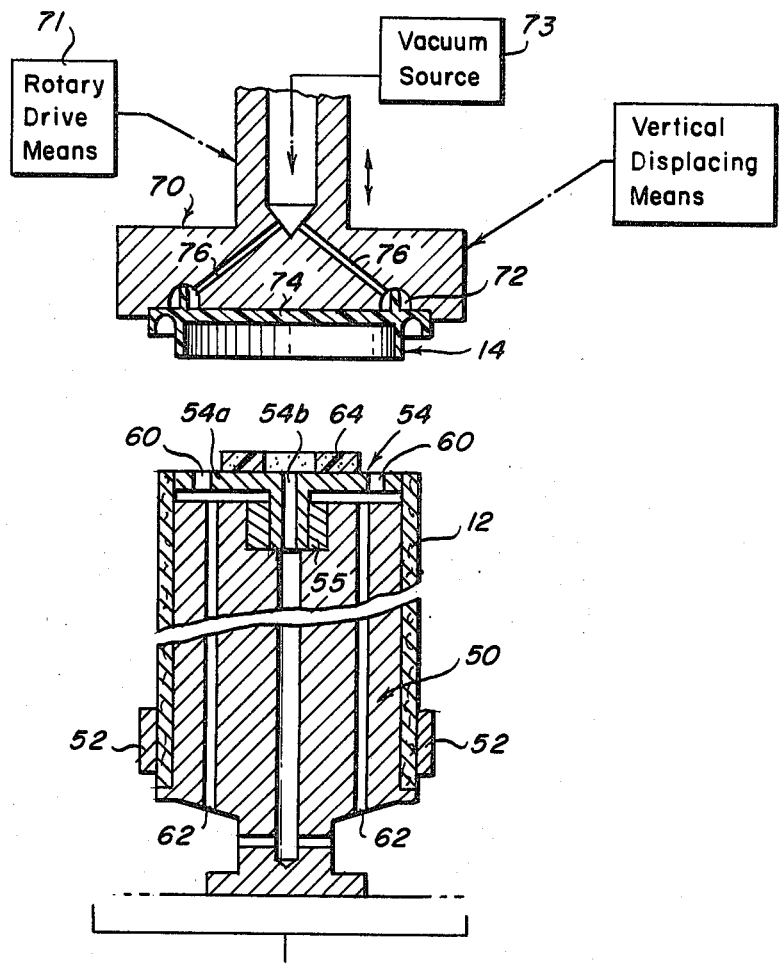
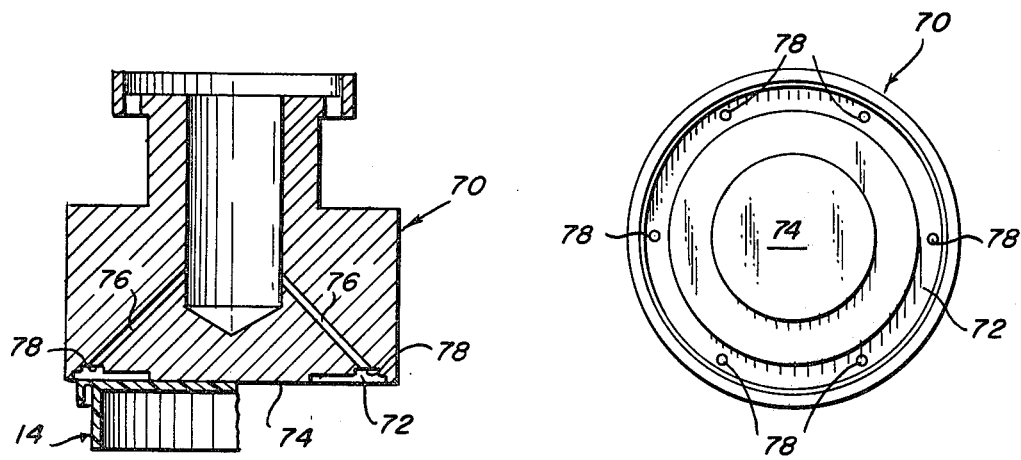
Fig. 5
Fig. 6
Fig. 7

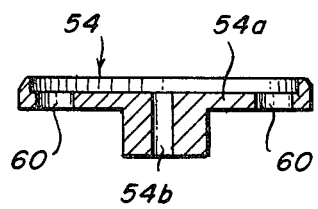
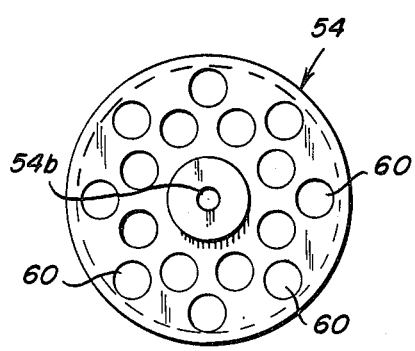
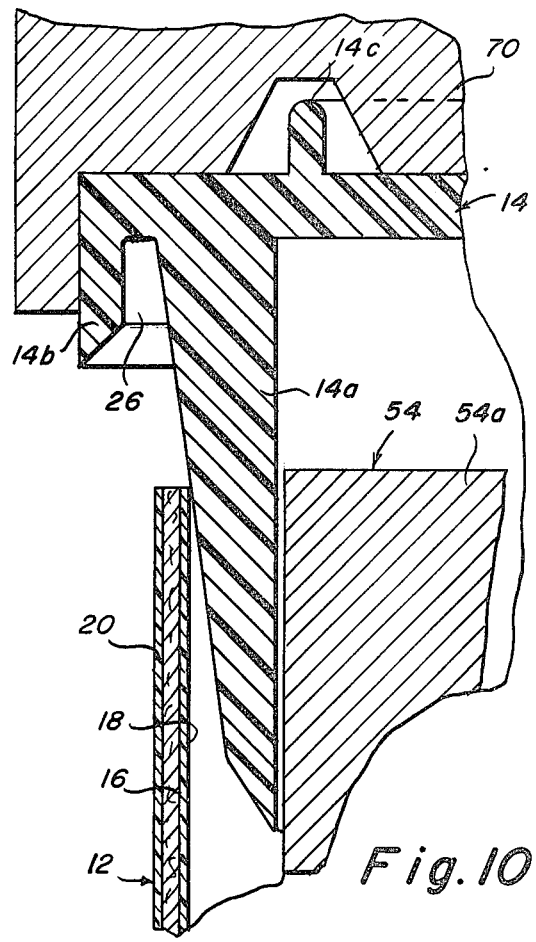
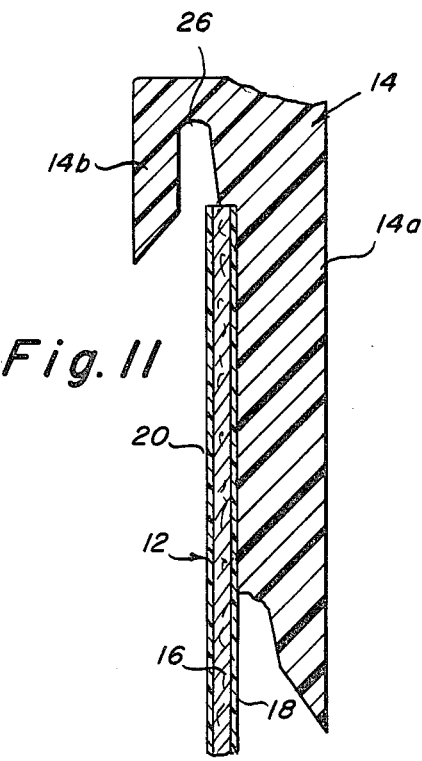
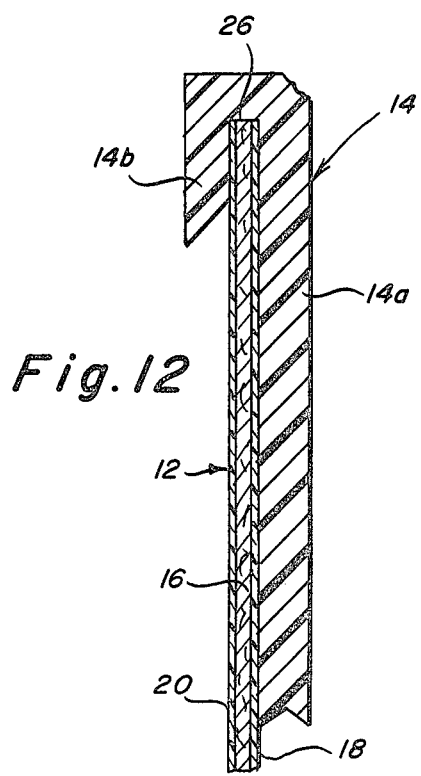

METHOD FOR SPIN BONDING ENDS FOR COMPOSITE CONTAINERS

BACKGROUND OF THE INVENTION

The present invention relates to a method and apparatus for spin bonding a synthetic plastic end closure member to one end of a composite container body member, and to the resultant product. The concept of spin bonding, or friction welding as it is alternately termed, of two synthetic plastic parts, for instance a container body and an end closure or cap member, is known, as disclosed in the patents to Brown, U.S. Pat. Nos. 3,297,504 and 3,499,068; Jones, U.S. Pat. No. 3,712,497, and Standley, U.S. Pat. No. 4,075,820. Generally, the two synthetic plastic parts are of substantially equal thickness so that when they are spinning in frictional engagement, the heat created is sufficient to soften and subsequently bond the parts.

Owing to the relatively small thickness of the inner liner layer, the spin bonding of a synthetic plastic end closure member to a composite container body member presents certain inherent problems. More particularly, the end closure member is generally at least 50 times thicker than the thermoplastic inner liner layer, and in the past, prior attempts to spin bond the two parts together have been generally unsuccessful. Thus, the thin thermoplastic inner layer is often either torn or disturbed from its engagement with the composite body wall when it is displaced into spinning frictional engagement with thicker plastic end closure member. Therefore, prior to the invention, it was difficult to produce a continuous fluid tight seal in a composite container including a synthetic plastic end closure member spin bonded to the thin thermoplastic inner liner layer of a composite body member.

Furthermore, a conventional plastic end member which is bonded to a container body member has a tendency, when stressed during filling and handling of the container, to flex in such a manner that it peels away from the sides of the container where it is in bonding engagement therewith, thereby destroying the integrity of the seal between the end closure and body members.

SUMMARY OF THE INVENTION

The method, apparatus and product of the present invention were developed to overcome the above and other disadvantages of the prior art. More particularly, it is a primary object of the present invention to provide a method and apparatus for spin bonding a synthetic plastic inner liner layer of a composite body member to produce a liquid-tight, peel-resistant seal between the two members.

According to a further object, a composite container is provided including a novel synthetic plastic end closure member having annular, downwardly depending inner fin and outer chime portions that are concentrically spaced to define an annular groove. Before the engagement of the end closure member with the body member, the fin portion of the end closure member is, on its outer surface, inwardly tapered. Consequently, the end closure member resists the tendency to flex in such a manner as to peel away from the composite body wall member, and instead flexes in such a manner that the central panel portion of the end member absorbs the tensile stresses directed on the end closure member and the end closure member remains intact with the composite body member.

According to another object of the invention, prior to the spin bonding connection of the end closure member to the body member, the end extremity of the body member is flared radially outwardly, whereupon one of the end closure and body members is rotated relative to the other at a rotational velocity sufficient to produce the necessary friction for spin bonding, the flared extremity of the body member being wedged into the annular groove contained in said end closure member while simulataneously supporting the end closure fin portion against radial inward displacement.

BRIEF DESCRIPTION OF THE DRAWING

Additional objects and advantages of the present invention will become apparent from the following detailed description when viewed in light of the accompanying drawings in which:

FIG. 1 is a detailed cross-sectional view of a pair of stacked composite containers of the present invention;

FIG. 2 is a detailed cross-sectional view of a pair of stacked end closure members in accordance with the present invention.

FIG. 3 is a top sectional view of one of the end closure members of FIG. 2;

FIG. 4 is a cross-sectional view illustrating one embodiment of the flaring process;

FIG. 5 is a cross-sectional view of the spin bonding apparatus of the present invention;

FIGS. 6 and 7 are cross-sectional and bottom plan views, respectively, of the rotary chuck means of FIG. 5;

FIGS. 8 and 9 are sectional and bottom plan views, respectively, of the rotary mandrel means of FIG. 5; and FIGS. 10, 11 and 12 are progressive cross-sectional views of the spin bonding process in accordance with the present invention.

DETAILED DESCRIPTION OF THE INVENTION

With reference to FIG. 1, composite container 10 includes a cylindrical vertically arranged body member 12 and synthetic plastic end closure member 14 spin bonded thereto. Body member 12 includes at least one fibrous body wall layer 16, a thermoplastic synthetic plastic inner liner layer 18 and an outer label layer 20.

End closure member 14 includes annular downwardly depending concentrically spaced inner sealing fin and outer chime portions, 14a and 14b, respectively, which define therebetween an annular groove 26. The upper extremity of body member 12 is located in annular groove 26, fin portion 14a and thermoplastic inner liner layer 18 being spin bonded into sealing relation. In accordance with an important feature of the present invention, the thickness of the fin portion 14a is on the order of 20 to 50 times that of the liner layer 18. More particularly, for reasons of economy, the liner layer 18 is maintained relatively thin, but for reasons of strength, a fin portion of substantial thickness is desired. Thus, the fin and chime connecting portions of the end closure member must be of sufficient strength to maintain the integrity of the bond not only during flexing of the central portion of the end relative to the fin and chime portions, but also during stacking of the containers. To this end, the end closure member 14 further includes an annular upwardly extending portion 14c which allows the composite containers to be stacked one upon another in a positive manner. A plurality of cicumferentially spaced radial strengthening ribs 14d (FIG. 3) extend inwardly from the inner surface of stacking portion 14c. The circular central panel portion 14e of the end closure member also includes an annular rib portion 14f. The radial and annular rib portions 14d and 14f, respectively, contribute to the strength of the end closure member.

All corners of the end closure member are rounded in such a manner as to eliminate stresses within. When the end closure member is stressed during filling of the composite container or subsequent handling thereof, the circular central panel portion 14e flexes relative to the fin and chime portions 14a and 14b, respectively, which flexing eliminates the prior tendency of the end member to peel away from the body member in the seal area.

A plurality of the end closure members 14 may be stacked one upon another in a positive manner as is shown in FIG. 2. This is especially convenient when shipping the ends from manufacturer to user in that it eliminates costly air space shipping.

Prior to is connection with body member 12, the fin portion 14a of the end closure member is vertically inwardly tapered on its outer surface, as shown in FIG. 2. The tapered fin portion forms an acute angle of approximately 2.5–5.0 degrees with the vertical. This taper feature is very important to the integrity of the final spin-bonded seal between the end closure and body members in that it allows sufficient space for the excess molten plastic which is formed in the spin bonding process to flow downwardly without disturbing the thin thermoplastic inner liner layer of the body member.

The method of spin bonding, and the apparatus employed therefor, are both important to the success of the final spin bonded composite container of the present invention.

To ensure a close, tight fit between the end closure and body members, it is necessary to size the upper extremity of the body member to a controlled dimension and slightly round off the upper edge. In accordance with another important feature of the invention, the sizing and rounding operations are achieved in a single flaring step as demonstrated in FIG. 4. A cylindrical flaring die 40 is inserted in the upper extremity of body member 12, which die 40 includes an upwardly, outwardly tapered circumferential portion 40a which merges at its upper end in an outward, slightly concave surface 40b. Circumferential surface 40a fits closely to body member 12 and as it is inserted therein, it sizes and rounds body member 12 as it flares the upper extremity 12a. Any conventional tooling which achieves the same flaring of the body member may be substituted for flaring die 40. The flaring operation eliminates any variation in the diameter of the upper end of body member 12 due to materials, machinery and weather conditions. Generally, the flaring increases the inside diameter of the body member by approximately 0.01 inches.

The body member 12 is releasably secured to stationary, vertically arranged central mandrel means 50 which is inserted therein as shown in FIG. 5. Clamp means 52 retain body member 12 against central mandrel means 50, thereby preventing movement of body member 12 relative to the central mandrel means. Other securing means, such as vacuum suction means or expansible mandrel means, may be substituted for the clamp means shown in FIG. 5.

Rotary mandrel means 54 are rotatably connected with central mandrel means 50 and include disk portion 54a and shaft portion 54b which is journalled in the upper end of the central mandrel means 50. The rotary and central mandrel means include a plurality of vertical air passages 60 and 62, respectively, the passages 62 being in communication with atmosphere near the base of the central mandrel means 50. These air passages may be of configurations other than vertical as long as they form an air passage during the spin bonding process from the top of the rotary mandrel means through the central mandrel means to the atmosphere.

A cross-sectional view of rotary mandrel means 54 is shown in FIG. 8, and a top view of the same is shown in FIG. 9. The diameter of disk portion 54a is generally equal to the inner diameter of sealing fin portion 14a of the end closure member. The disk portion is important to the success of the spin bonding process, as will be explained in detail below.

A compressible member 64 is mounted on the upper surface of disk portion 54a of the rotary mandrel means, which member 64 is of a suitable resilient material, such as foam rubber or the like.

Referring to FIGS. 5–7, a vertically displaceable rotary chuck means 70 is axially aligned in vertically spaced relation above the central and rotary mandrel means 50 and 54, which chuck means is driven by rotary drive means 71 at a rotational velocity sufficient to effect spin bonding (i.e., about 3000 rpm). The rotary chuck means includes means for mounting a plastic end closure member 14 on the lower surface thereof. In the illustrated embodiment, the mounting means includes a vacuum source 73 that communicates via passages 76 and orifices 78 with annular groove 72 contained in the lower surface of the rotary chuck means 70, thereby holding the end closure member in place.

OPERATION

In operation, the container body member 12 is mounted on central mandrel means 50 by clamp means 52 so that there is no vertical or rotational movement of body member 12 relative to central mandrel means 50, and end closure member 14 is mounted on rotary chuck means 70.

Rotary chuck means 70, with end closure member 14 mounted thereon as shown in FIG. 5, is rotated at a rotational velocity sufficient to effect the desired spin bonding (i.e., about 3000 rpm). While rotary chuck means 70 is rotating, it is vertically, axially displaced downwardly to cause the lower surface of circular central panel portion 32 of the end closure member to engage compressible material 64, thereby causing rotary mandrel means 54 to spin in bearings 55 at the rotational velocity of the rotary chuck means 70. Therefore, as rotary chuck means 70 is further displaced downwardly, compressible material 64 is compressed and sealing fin portion 14 of the end closure member is supported, as shown in FIG. 10, by disk portion 54a of the rotary mandrel means which is rotating at a velocity less than or equal to the velocity of the end closure member.

Disk portion 54a supports sealing fin portion 14a against inward radial deflection or scuffing as the rotating end closure member is lowered into engagement with the body member. The rotary driving mechanism of the rotary chuck means is disengaged to allow the chuck means to spin freely. With reference to FIG. 11, end closure member 14 is then quickly inserted in the upper end of body member 12 such that the flared upper extremity of body member 12 is progressively wedged tightly within annular groove 26 contained in the end member, and sealing fin portion 14 is wedged between the thermoplastic inner liner layer 18 of the body member and disk portion 54a of the rotary mandrel means. The spinning frictional engagement between the thermoplastic inner liner and the plastic sealing fin portion creates heat sufficient to soften and subsequently spin bond the contiguous thermoplastic materials. The rotary chuck means is then removed from the end closure member.

According to an important feature of the invention, owing to the support of sealing fin portion 14a and its downwardly inwardly tapered outer surface, the excess molten plastic created during the spin bonding flows downwardly as shown in FIG. 11, thereby to provide an even thickness and to prevent thermoplastic inner liner layer 18 from tearing as shown in FIG. 12. A strong, liquid-tight spin-bonded seal is thereby provided in a composite container.

Although in the illustrated embodiment the end closure member is spun while the body member is maintained stationary, it is within the scope of the present invention, of course, to hold the end closure member stationary and spin the body member. Similarly, while in the described method the end closure member is vertically axially displaced while the body member is held stationary, it is equally within the scope of the invention to displace the body member and to hold the end closure member stationary.

Once the spin bonding has occurred, clamping means 52 of the central mandrel means are removed from body member 12, whereby the body member, with the end closure member spin bonded thereto, is removed from the central mandrel means. To this end, air passages 60 and 62 are provided which prevent a vacuum from forming between the rotary and central mandrel means and the end and body members.

A metal end closure member (not shown) is connected with the bottom end of body member 12 in any conventional manner once the composite container is filled. Of course, it is within the scope of the present invention to reverse the container so that the synthetic plastic end closure member is spin-bonded to the bottom of the vertically arranged body wall, and the metal end closure member is subsequently applied to the upper end of the container.

The spin bonded seal between the plastic end closure member and the body member is sufficiently strong to withstand any stress created by the conventional bottom end closing operation. Tests have been established that the connection between the inner liner layer and the spin bonded synthetic plastic end is 3 to 4 times stronger than a conventional rolled seam connection between a composite body wall and a metal end closure member. In this regard, it is to be noted that an upwardly directed force on the central portion of the end 14 will produce bending of the end at the portion thereof between the stacking rib 14c and the fin portion 14a, thereby maintaining the integrity of the seal between the fin portion 14a and the inner liner layer 18 (which seal is subjected to forces of shear rather than forces of peel). To this end, the junctions of the stacking rib 14c to the upper surface of the end are preferably radiused.

The inner liner layer 18, which generally has a thickness of from about 0.0005" to about 0.0030", is formed from a conventional heat sealable thermoplastic synthetic plastic material, such as a polyfin, a styrene, a polycarbonate, an acrylic polymer, or the like.

As shown in FIG. 10, the taper angle of the outer surface of the fin portion 14a is slightly greater relative to the vertical than the angle of the flared upper extremity 12a of the composite body member 12.

While the preferred forms and embodiments of the invention have been illustrated and described, it will be apparent that modifications may be made without deviating from the scope of the invention set forth above.

What is claimed is:

1. The method of spin bonding to one end of a vertically arranged tubular composite container body member an end closure member formed of thermoplastic synthetic plastic material, said body member including a fibrous body wall layer, an inner liner layer formed of a thermoplastic synthetic plastic material, and an outer label layer, said end closure member including opposite said body member annular inner fin and outer chime portions that are concentrically spaced to define an annular groove arranged to receive the adjacent extremity of said body member, said groove having side walls that converge in the direction of the bottom of the groove, which comprises the steps of
    (a) flaring radially outwardly the extremity of the composite body member adjacent the end closure member;
    (b) rotating one of the end closure and body members relative to the other, when said members are in spaced vertical alignment, at a rotational velocity sufficient to produce friction welding; and
    (c) axially displacing said members together to wedge the flared extremity of said body member within said annular groove while simultaneously supporting the end closure fin portion against radial inward deflection.

2. The method of spin bonding as defined in claim 1, further comprising the steps of:
    (a) releasably securing said body member to a vertically arranged stationary central mandrel means;
    (b) mounting said end closure member on a rotary chuck means in vertical alignment with and vertically displaceable relative to the central mandrel means; and
    (c) rotating said end closure member relative to said body member at a rotational velocity sufficient to produce friction welding.

3. The method of spin bonding as defined in claim 1, wherein said one of the end closure and body members is rotated at a rotational velocity of about 3,000 r.p.m.

* * * * *